United States Patent
Lee et al.

(10) Patent No.: US 10,636,564 B2
(45) Date of Patent: Apr. 28, 2020

(54) RECEIVING ANTENNA AND WIRELESS POWER RECEIVING APPARATUS COMPRISING SAME

(71) Applicant: LG Innotek Co., Ltd., Seoul (KR)

(72) Inventors: Jung Eun Lee, Seoul (KR); Sang Won Lee, Seoul (KR); Seok Bae, Seoul (KR); Soon Young Hyun, Seoul (KR); Hee Jung Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 307 days.

(21) Appl. No.: 15/515,431

(22) PCT Filed: Sep. 16, 2015

(86) PCT No.: PCT/KR2015/009696
§ 371 (c)(1),
(2) Date: Mar. 29, 2017

(87) PCT Pub. No.: WO2016/052887
PCT Pub. Date: Apr. 7, 2016

(65) Prior Publication Data
US 2017/0213644 A1  Jul. 27, 2017

(30) Foreign Application Priority Data
Sep. 29, 2014 (KR) .................. 10-2014-0130527

(51) Int. Cl.
*H02J 7/02* (2016.01)
*H01F 38/14* (2006.01)
(Continued)

(52) U.S. Cl.
CPC .............. *H01F 38/14* (2013.01); *H01F 1/12* (2013.01); *H01F 1/14725* (2013.01);
(Continued)

(58) Field of Classification Search
CPC ........ H01F 38/14; H01F 1/12; H01F 1/14725; H01F 1/15308; H02J 7/0042
(Continued)

(56) References Cited

U.S. PATENT DOCUMENTS

2005/0072595 A1*  4/2005  Cho ................. G06K 19/07749
174/260
2014/0167521 A1*  6/2014  Leem ...................... H02J 5/005
307/104
(Continued)

FOREIGN PATENT DOCUMENTS

KR  1020090056457 A  6/2009
KR  1020120086669 A  8/2012
(Continued)

OTHER PUBLICATIONS

International Search Report in International Application No. PCT/KR2015/009696, filed Sep. 16, 2015.
(Continued)

*Primary Examiner* — Edward Tso
*Assistant Examiner* — Aaron Piggush
(74) *Attorney, Agent, or Firm* — Saliwanchik, Lloyd & Eisenschenk

(57) ABSTRACT

A receiving antenna of a wireless power receiving apparatus for wireless power charging according to one embodiment of the present invention comprises: a substrate; a soft magnetic layer disposed on the substrate; and a receiving coil which is wound in parallel with a plane of the soft magnetic layer and is embedded on one surface of the soft magnetic layer, wherein at least one surface of the receiving coil is slantly embedded on the one surface of the soft magnetic layer.

21 Claims, 14 Drawing Sheets

(51) Int. Cl.
*H01Q 11/08* (2006.01)
*H01F 27/36* (2006.01)
*H01F 27/28* (2006.01)
*H01Q 7/08* (2006.01)
*H02J 50/10* (2016.01)
*H01F 1/12* (2006.01)
*H01F 1/147* (2006.01)
*H01F 1/153* (2006.01)
*H01F 27/255* (2006.01)
*H02J 5/00* (2016.01)

(52) U.S. Cl.
CPC ..... *H01F 1/15308* (2013.01); *H01F 1/15316* (2013.01); *H01F 27/255* (2013.01); *H01F 27/28* (2013.01); *H01F 27/2871* (2013.01); *H01F 27/365* (2013.01); *H01Q 7/08* (2013.01); *H01Q 11/08* (2013.01); *H02J 5/005* (2013.01); *H02J 50/10* (2016.02); *H02J 7/025* (2013.01)

(58) Field of Classification Search
USPC .................................. 320/108, 115; 307/104
See application file for complete search history.

(56) References Cited

U.S. PATENT DOCUMENTS

2015/0054455 A1   2/2015  Kim et al.
2015/0077296 A1*  3/2015  An .......................... H01P 11/00
                                                        343/720

FOREIGN PATENT DOCUMENTS

| KR | 10-2013-008858 A | 8/2013 |
| KR | 101394508 B1 | 5/2014 |
| KR | 1020140066415 A | 6/2014 |
| KR | 1020140076994 A | 6/2014 |

OTHER PUBLICATIONS

Office Action dated Feb. 27, 2020 in Korean Application No. 10-2014-0130527.

* cited by examiner

RECEIVING ANTENNA AND WIRELESS POWER RECEIVING APPARATUS COMPRISING SAME

CROSS-REFERENCE TO RELATED APPLICATIONS

This application is the U.S. national stage application of International Patent Application No. PCT/KR2015/009696, filed Sep. 16, 2015, which claims priority to Korean Application No. 10-2014-0130527, filed Sep. 29, 2014, the disclosures of each of which are incorporated herein by reference in their entirety.

TECHNICAL FIELD

The present invention relates to wireless charging, and more particularly, to a receiving antenna for wireless charging and a wireless power receiving apparatus including the same.

BACKGROUND ART

With development of wireless communication technology, there has been increased interest in wireless power transmitting and receiving technology for wirelessly supplying power to an electronic device. The wireless power transmitting and receiving technology can be applied for various purposes including power supply to electronic products for home use and power supply to electric vehicles or subways as well as battery charging of a portable terminal.

General wireless power transmitting and receiving technology uses a principle of magnetic induction or magnetic resonance. For example, when electrical energy is applied to a transmitting antenna of a wireless power transmitting apparatus, the transmitting antenna may convert the electrical energy into electromagnetic energy and radiate the electromagnetic energy to surroundings. Also, a receiving antenna of a wireless power receiving apparatus may receive the electromagnetic energy radiated from the transmitting antenna and convert the electromagnetic energy into electrical energy.

Here, to improve power transmitting and receiving efficiency, there is a need to minimize energy loss between the wireless power transmitting apparatus and the wireless power receiving apparatus. For this, the transmitting antenna and the receiving antenna may be aligned with each other within an effective distance. Also, a soft magnetic material may be arranged near the transmitting antenna and the receiving antenna, and the electromagnetic energy radiated by the transmitting antenna may be focused in a direction of the receiving antenna.

For this, a receiving coil is formed on a soft magnetic layer. Here, a problem in that a magnetic field guiding effect of the soft magnetic layer is decreased may occur due to a void formed between the soft magnetic layer and the receiving coil.

DISCLOSURE

Technical Problem

The present invention is directed to providing a structure of a receiving antenna for improving wireless power receiving efficiency of a wireless power receiving apparatus.

Technical Solution

According to an embodiment of the present invention, a receiving antenna of a wireless power receiving apparatus for wireless power charging includes a substrate, a soft magnetic layer disposed on the substrate, and a receiving coil which is wound in parallel with a plane of the soft magnetic layer and is embedded in one surface of the soft magnetic layer, wherein a cross-section of the receiving coil includes one side adjacent to the surface of the soft magnetic layer, and at least one of two sides which meet the one side forms an inclination with the one side.

The at least one of the two sides which meet the one side may form an angle which is 50° or larger and smaller than 90° with the one side.

The at least one of the two sides which meet the one side may form an angle which is 60° or larger and 75° or smaller with the one side.

The at least one of the two sides which meet the one side may form an angle which is 65° or larger and 70° or smaller with the one side.

The cross-section of the receiving coil may be a polygon including the one side adjacent to the surface of the soft magnetic layer and the two sides which meet the one side.

The cross-section of the receiving coil may be a trapezoid further including another side which is in parallel with the one side and meets the two sides.

The cross-section of the receiving coil may further include a curve which connects the two sides.

An insulating layer may be formed between the soft magnetic layer and the receiving coil.

The insulating layer may include a polyethylene terephthalat (PET) material.

The soft magnetic layer may include a plurality of sheets containing soft magnetic metal powder and polymer resin.

The receiving antenna may further include a support means disposed on the receiving coil.

A total thickness of the soft magnetic layer, the receiving coil, and the support means may be 613 μm or larger and smaller than 647 μm.

According to an embodiment of the present invention, a receiving antenna of a wireless power receiving apparatus for wireless power charging includes a substrate, a soft magnetic layer disposed on the substrate and having a groove formed on one surface, and a receiving coil which is wound in parallel with a plane of the soft magnetic layer and is accommodated in the groove formed on the surface of the soft magnetic layer, wherein the groove includes both wall surfaces which meet the surface of the soft magnetic layer and a bottom surface which meets the both wall surfaces, and the surface and at least one of the both wall surface form an inclination.

According to an embodiment of the present invention, a wireless power receiving apparatus for wireless power charging includes a substrate, a soft magnetic layer disposed on the substrate, a receiving coil which is wound in parallel with a plane of the soft magnetic layer and is embedded in one surface of the soft magnetic layer, a circuit unit connected to the receiving coil and configured to convert the electromagnetic energy into electrical energy, and a storage unit configured to store the electrical energy, wherein a cross-section of the receiving coil includes one side adjacent to the surface of the soft magnetic layer, and at least one of two sides which meet the one side forms an inclination with the one side.

Advantageous Effects

According to an embodiment of the present invention, because electromagnetic energy focusing performance of a receiving antenna can be improved in a wireless power receiving apparatus, wireless power transmitting and receiving efficiency can be maximized. Particularly, a magnetic field guiding effect of a soft magnetic layer can be improved by removing a void between a receiving coil and the soft magnetic layer, and improved power transmission efficiency can be obtained by decreasing a thickness of the receiving antenna and decreasing a distance between a transmitting antenna and the receiving antenna.

Accordingly, because a required level of electromagnetic energy focusing effect can be obtained even in small thickness, the receiving antenna is applicable to technology of various electronic devices (e.g., a television (TV), a portable terminal, a laptop, a tablet personal computer (PC), etc.) which are on the slimming trend.

Also, because the electromagnetic energy focusing performance is excellent and the cost of material is cheap, the receiving antenna is applicable to large-size application fields such as electric vehicles, subways, and electric railways.

MODES OF THE INVENTION

Figure 1:
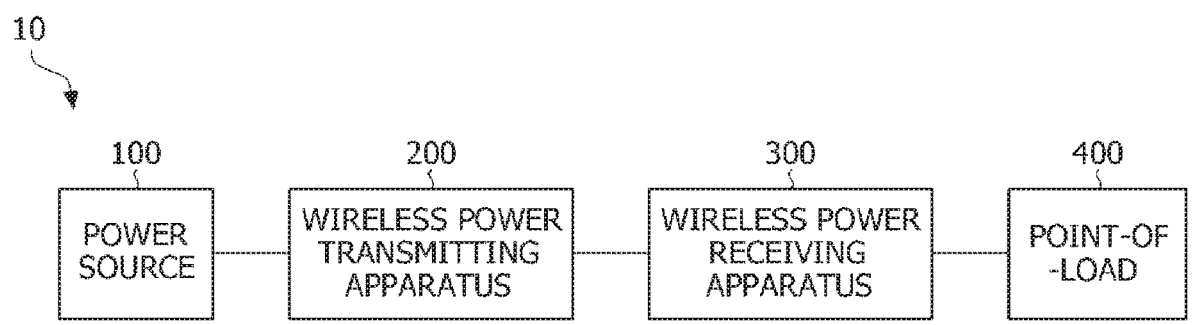
FIG. 1 illustrates a wireless charging system according to an embodiment of the present invention.

Since various modifications may be made to the present invention and the present invention may have various embodiments, particular embodiments will be illustrated in the drawings and described. However, this does not limit the present invention to the particular embodiments, and all modifications, equivalents, and substitutes included in the spirit and technical scope of the present invention should be construed as belonging to the present invention.

Terms including ordinals such as first and second may be used to describe various elements, but the elements are not limited by the terms. The terms are only used for the purpose of distinguishing one element from another element. For example, a second element may be referred to as a first element while not departing from the scope of the present invention, and likewise, a first element may also be referred to as a second element. The term and/or includes a combination of a plurality of related described items or any one item among the plurality of related described items.

When it is mentioned that a certain element is "connected" or "linked" to another element, although the certain element may be directly connected or linked to the other element, should be understood that another element may exist therebetween. On the other hand, when it is mentioned that a certain element is "directly connected" or "directly linked" to another element, it should be understood that other elements do not exist therebetween.

Terms used in the application are merely used to describe particular embodiments and are not intended to limit the present invention. A singular expression includes a plural expression unless the context clearly indicates otherwise. In the application, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Unless otherwise defined, all terms including technical or scientific terms used herein have the same meaning as commonly understood by one of ordinary skill in the art to which the present invention pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, an embodiment will be described in detail with reference to the accompanying drawings while like reference numerals will be given to the same or corresponding elements regardless of signs in the drawings and overlapping descriptions thereof will be omitted.

FIG. 1 illustrates a wireless charging system according to an embodiment of the present invention.

Referring to FIG. 1, a wireless charging system 10 includes a power source 100, a wireless power transmitting apparatus 200, a wireless power receiving apparatus 300, and a point-of-load 400.

The wireless power transmitting apparatus 200 is connected to the power source 100, and receives power from the power source 100. Also, the wireless power transmitting apparatus 200 wirelessly transmits power to the wireless power receiving apparatus 300. Here, the wireless power transmitting apparatus 200 may transmit power using an electromagnetic induction method or a resonance method. Although the power source 100 and the wireless power transmitting apparatus 200 are illustrated as separate configurations, embodiments are not limited thereto. The power source 100 may also be included in the wireless power transmitting apparatus 200.

The wireless power receiving apparatus 300 wirelessly receives power from the wireless power transmitting apparatus 200. The wireless power receiving apparatus 300 may also receive power using the electromagnetic induction method or the resonance method. Also, the wireless power receiving apparatus 300 supplies the received power to the point-of-load 400.

Figure 2:
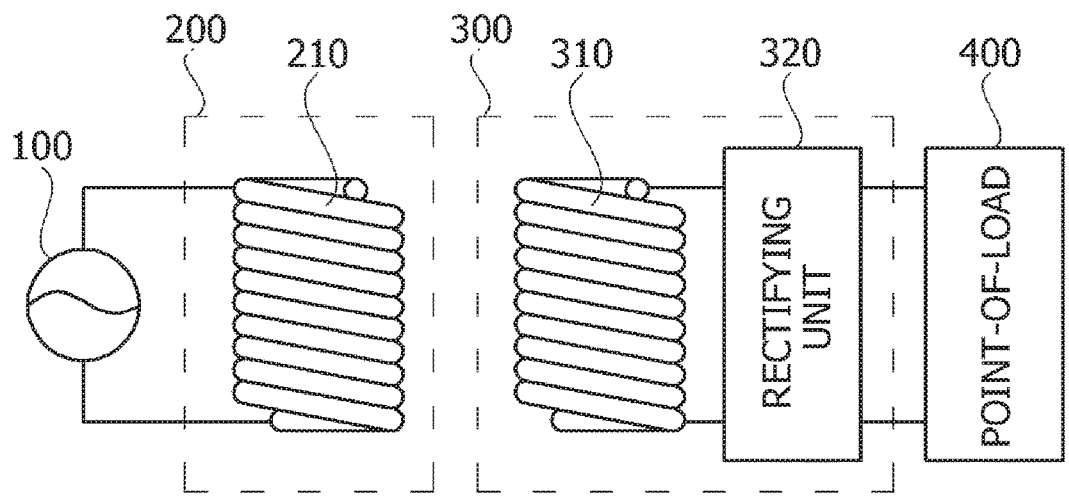
FIG. 2 is a view illustrating a wireless power transmitting and receiving method of the wireless charging system according to an embodiment of the present invention.

FIG. 2 is a view illustrating a wireless power transmitting and receiving method of the wireless charging system according to an embodiment of the present invention.

Referring to FIG. 2, the wireless power transmitting apparatus 200 may include a transmitting coil 210. The wireless power receiving apparatus 300 may include a receiving coil 310 and a rectifying unit 320.

The power source 100 may generate alternating current power having a predetermined frequency and supply the alternating current power to the transmitting coil 210 of the wireless power transmitting apparatus 200.

Also, an alternating current generated by the transmitting coil 210 may be transmitted to the receiving coil 310 which is inductively coupled to the transmitting coil 210. Alternatively, power transmitted to the transmitting coil 210 may also be transmitted to the wireless power receiving apparatus 300 having the same resonance frequency as that of the wireless power transmitting apparatus 200. Power may be transmitted by resonance between two inductor-capacitor (LC) circuits having matching impedances.

The power transmitted to the receiving coil 310 using the electromagnetic induction method or the resonance method may be rectified through the rectifying unit 320 and transmitted to the point-of-load 400.

Figure 3:
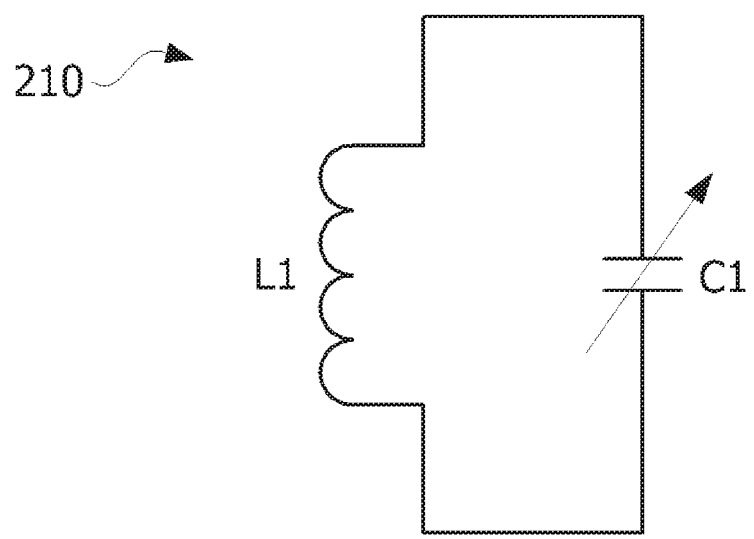
FIG. 3 illustrates an equivalent circuit diagram of a transmitting coil according to an embodiment of the present invention.

FIG. 3 illustrates an equivalent circuit diagram of a transmitting coil according to an embodiment of the present invention.

Referring to FIG. 3, the transmitting coil 210 may include an inductor L1 and a capacitor C1, and both ends of the inductor L1 may be connected to both ends of the capacitor C1.

Here, the capacitor C1 may be a variable capacitor, and impedance matching may be performed as capacitance of the capacitor C1 is adjusted. Although an equivalent circuit diagram of the receiving coil 310 may also be similar with the equivalent circuit diagram of the transmitting coil 210, embodiments are not limited thereto.

Figure 4:
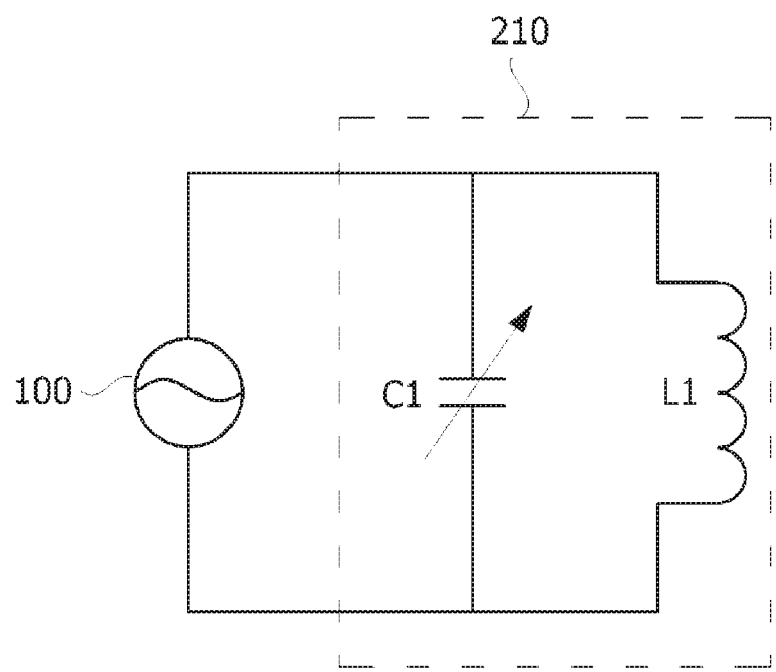
FIG. 4 illustrates an equivalent circuit diagram of a power source and a wireless power transmitting apparatus according to an embodiment of the present invention.

FIG. 4 illustrates an equivalent circuit diagram of a power source and a wireless power transmitting apparatus according to an embodiment of the present invention.

Referring to FIG. 4, the transmitting coil 210 may include an inductor L1 and a capacitor C1 having an inductance value and a capacitance value.

Figure 5:
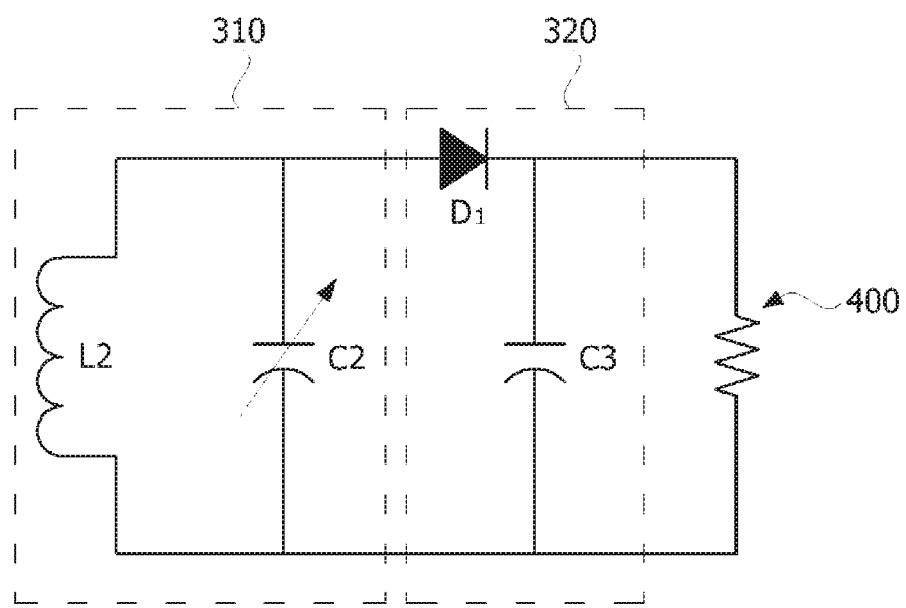
FIG. 5 illustrates an equivalent circuit diagram of a wireless power receiving apparatus according to an embodiment of the present invention.

FIG. 5 illustrates an equivalent circuit diagram of a wireless power receiving apparatus according to an embodiment of the present invention.

Referring to FIG. 5, the receiving coil 310 may include an inductor L2 and a capacitor C2 having an inductance value and a capacitance value.

The rectifying unit 320 may convert alternating current power received from the receiving coil 310 into direct current power, and transmit the converted direct current power to the point-of-load 400.

Specifically, although not illustrated, the rectifying unit 320 may include a rectifier and a smoothing circuit. The rectifier may be, for example, a silicon (Si) rectifier and may be equalized via a diode D1, but embodiments are not limited thereto. The rectifier may convert the alternating current power received from the receiving coil 310 into direct current power. The smoothing circuit may remove an alternating current component included in the direct current power converted in the rectifier and output smooth direct current power. The smoothing circuit may be equalized via, for example, a capacitor C3, but embodiments are not limited thereto.

The point-of-load 400 may be a battery or an apparatus having a battery embedded therein.

Meanwhile, a quality factor and a coupling coefficient have important meanings in wireless power transmission. A quality factor Q refers to an index of energy that may be accumulated near the wireless power transmitting apparatus 200 or the wireless power receiving apparatus 300. The quality factor may vary depending on an operating frequency w and the shape, the size, the material, etc. of a coil and may be shown as Equation 1 below.

$$Q = w*Ls/Rs \quad \text{[Equation 1]}$$

Here, Ls represents inductance of a coil, and Rs represents resistance corresponding to power loss that occurs in the coil itself.

The quality factor may have a value in the range of 0 to infinity, and the power transmission efficiency between the wireless power transmitting apparatus 200 and the wireless power receiving apparatus 300 may be considered as being higher as the quality factor is larger.

Also, the coupling coefficient represents a magnetic coupling degree between the transmitting coil and the receiving coil and has the range of 0 to 1. The coupling coefficient may vary depending on relative positions of or a distance between the transmitting coil and the receiving coil.

Figure 6:
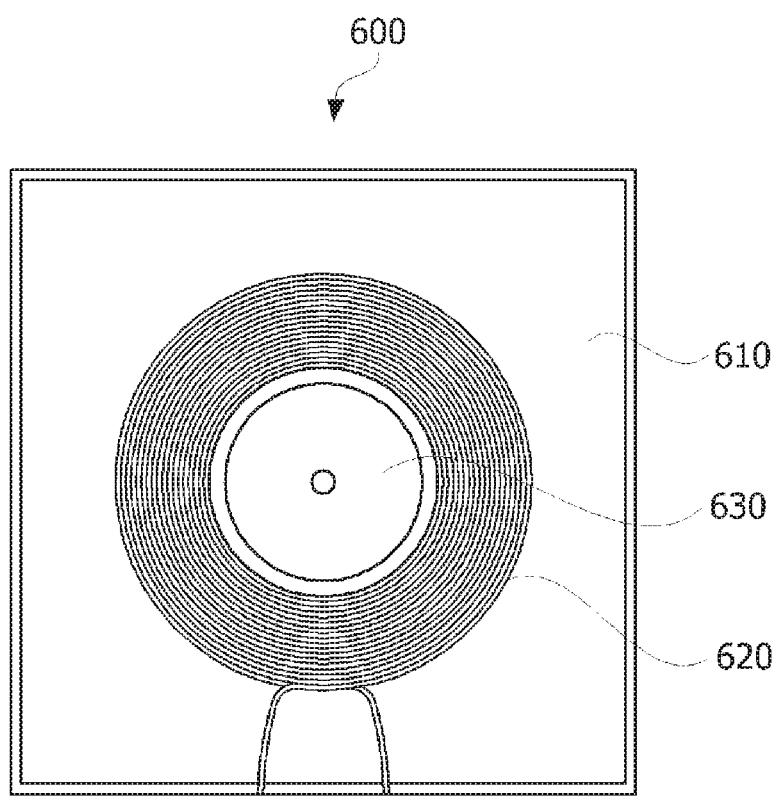
FIG. 6 is a top view of a soft magnetic layer and a transmitting coil included in a wireless power transmitting apparatus according to an embodiment of the present invention.
Figure 7:
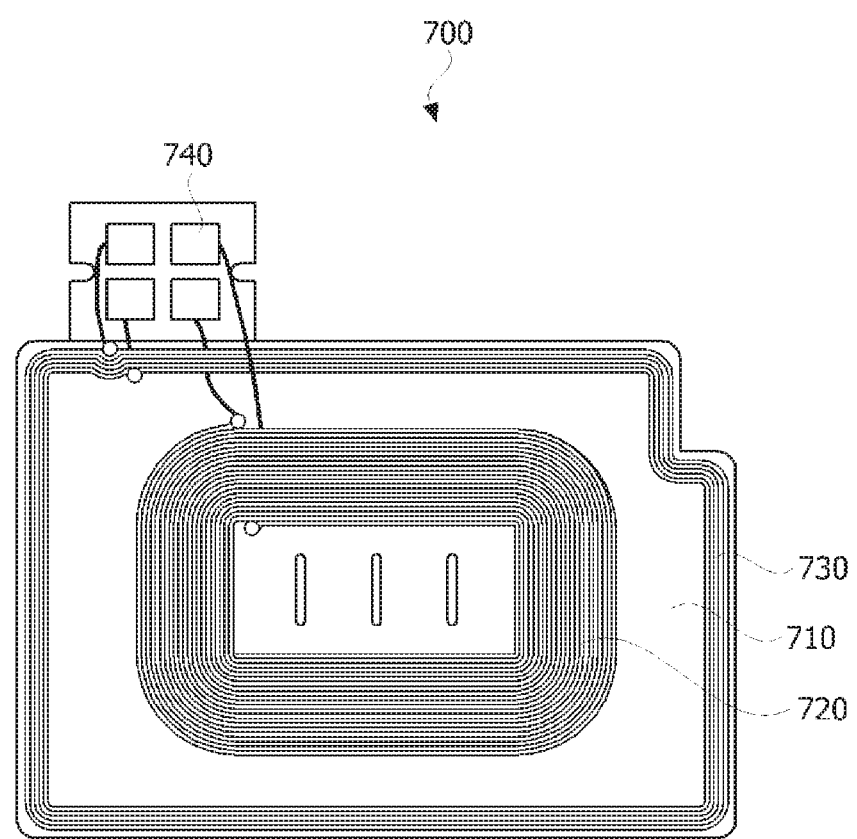
FIG. 7 is a top view of a soft magnetic layer and a receiving coil included in a wireless power receiving apparatus according to an embodiment of the present invention.

FIG. 6 is a top view of a soft magnetic layer and a transmitting coil included in a wireless power transmitting apparatus according to an embodiment of the present invention, and FIG. 7 is a top view of a soft magnetic layer and a receiving coil included in a wireless power receiving apparatus according to an embodiment of the present invention.

Referring to FIG. 6, a wireless power transmitting apparatus 600 includes a transmitting circuit (not illustrated), a soft magnetic core 610, a transmitting antenna 620, and a permanent magnet 630.

The soft magnetic core 610 may be formed of a soft magnetic material with a thickness of several mm. Also, the transmitting antenna 620 may be formed of a transmitting coil, and the permanent magnet 630 may be surrounded by the transmitting antenna 620. The permanent magnet 630 may be omitted depending on specifications.

Referring to FIG. 7, a wireless power receiving apparatus 700 includes a receiving circuit (not illustrated), a soft magnetic layer 710, and a receiving coil 720. The soft magnetic layer 710 may be formed on a substrate (not illustrated). The substrate may be formed of several layers of fixed sheets and fix the soft magnetic layer 710 by being bonded to the soft magnetic layer 710.

The soft magnetic layer 710 focuses electromagnetic energy radiated from the transmitting antenna 720 of the wireless power transmitting apparatus 700.

The soft magnetic layer 710 may be formed of a metal material or a ferrite material, and the soft magnetic layer 710 may be implemented in various forms such as a pellet, a plate, a ribbon, a foil, and a film. For example, the soft magnetic layer 710 may have a form in which a plurality of sheets containing single metal or alloy powder which exhibits soft magnetism (hereinafter, referred to as soft magnetic metal powder) and polymer resin are disposed. In another example, the soft magnetic layer 710 may be an alloy ribbon, a disposed ribbon, a foil, or a film including at least one of iron (Fe), cobalt (Co), and nickel (Ni). In still another example, the soft magnetic layer 710 may be a composite including 90 wt % or more of iron-silicon-chromium (FeSiCr) flake and 10 wt % or smaller of polymer resin. In yet another example, the soft magnetic layer 710 may be a sheet, a ribbon, a foil, or a film including nickel-zinc (Ni—Zn) based ferrite.

The receiving coil 720 is formed on the soft magnetic layer 710. The receiving coil 720 may be wound in a direction in parallel with that of a plane of the soft magnetic layer 710 on the soft magnetic layer 710. A receiving coil which is applied to smartphones may have the form of a spiral coil having, for example, an outer diameter within 50 mm and an inner diameter of 20 mm or larger. The receiving circuit converts electromagnetic energy received through the receiving coil 720 into electrical energy and charges a battery (not illustrated) with the converted electrical energy.

In the present specification, the soft magnetic layer 710 and the receiving coil 720 may be referred to as a receiving antenna.

Meanwhile, when the wireless power receiving apparatus 700 simultaneously has a wireless power conversion (WPC) function and a near-field communication (NFC) function, an NFC coil 730 may be further disposed on the soft magnetic layer 710. The NFC coil 730 may be formed to surround an outside of the receiving coil 720.

Also, each of the receiving coil 720 and the NFC coil 730 may be electrically connected via a terminal 740.

Figure 8:
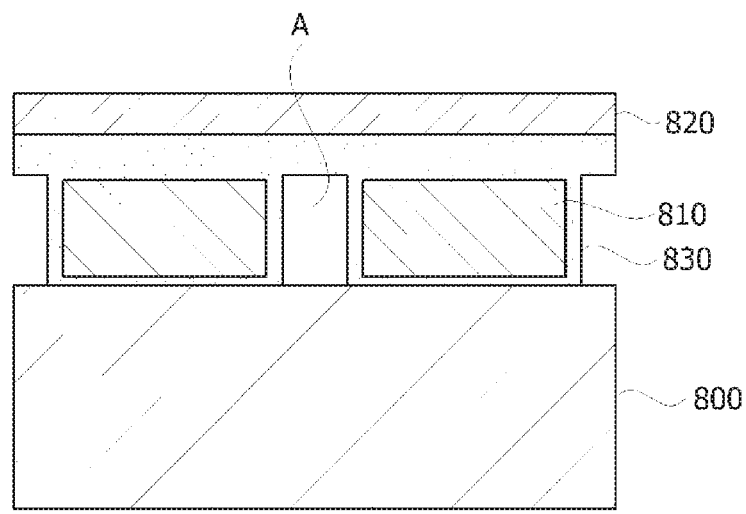
FIG. 8 illustrates an example of a cross-sectional view of a soft magnetic layer and a receiving coil.

FIG. 8 illustrates an example of a cross-sectional view of a soft magnetic layer and a receiving coil.

Referring to FIG. 8, receiving coils 810 are formed on a soft magnetic layer 800, and a support film 820 is formed on the receiving coils 810. Because the support film 820 is for supporting the receiving coils 810, the support film 820 may include PET material. The soft magnetic layer 800, the receiving coils 810, and the support film 820 may be adhered by an adhesive 830.

Here, because a void A is formed between the receiving coils 810, the magnetic field guiding effect of the soft magnetic layer 800 may be decreased.

Figure 9:
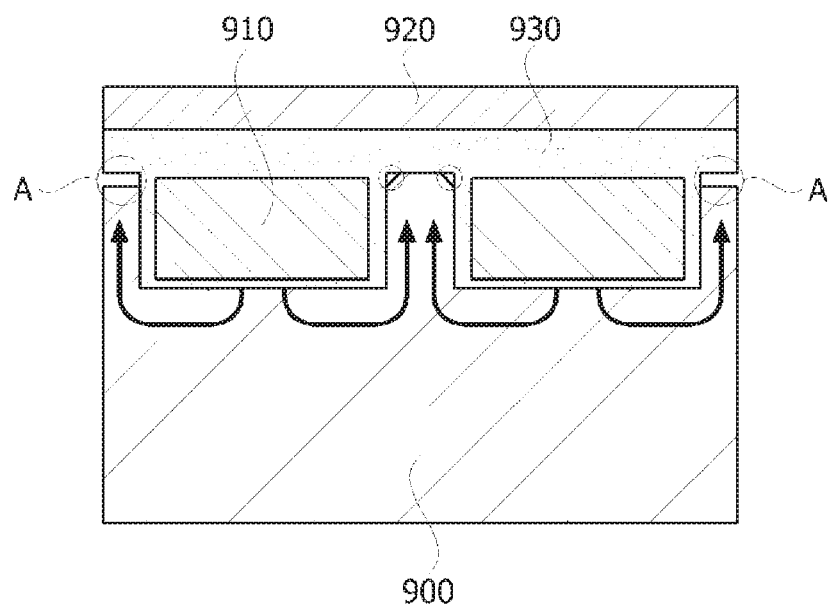
FIG. 9 is another example of a cross-sectional view of a soft magnetic layer and a receiving coil.
Figure 10:
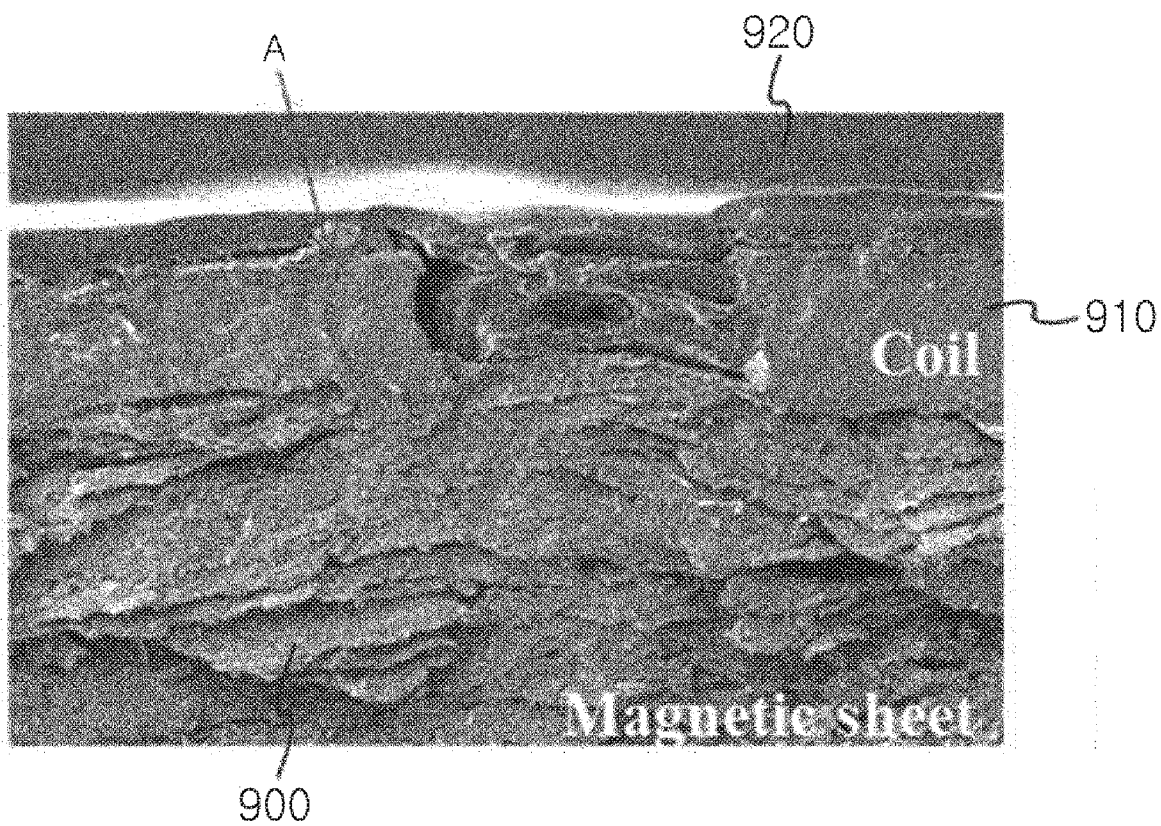
FIG. 10 illustrates a scanning electron microscope (SEM) of the soft magnetic layer and the receiving coil of FIG. 9.

FIG. 9 is another example of a cross-sectional view of a soft magnetic layer and a receiving coil, and FIG. 10 illustrates a scanning electron microscope (SEM) of the soft magnetic layer and the receiving coil of FIG. 9.

Referring to FIG. 9, receiving coils 910 are formed on a soft magnetic layer 900, and a support means 920 is formed on the receiving coils 910. The support means 920 is for supporting the receiving coils 910, may include a PET material, and may have the form of a film. The soft magnetic layer 900, the receiving coil 910, and the support film 920 may be adhered by an adhesive 930. Here, the receiving coils 910 are formed inside the soft magnetic layer 900. For example, the receiving coils 910 may be embedded in an upper surface of the soft magnetic layer 900. Accordingly, because voids A which are formed between the receiving coils and the soft magnetic layer are reduced, the power transmission efficiency can be improved.

However, when a surface of the soft magnetic layer 900 and wall surfaces of the receiving coils 910 form an angle of 90° as illustrated in FIG. 9, gaps between the coils may be narrow, and the soft magnetic layer 900 may be difficult to be infiltrated into the gaps. Accordingly, the soft magnetic layer 900 may not be completely filled in between the receiving coils 910. That is, even after the receiving coils are embedded as illustrated in FIGS. 9 and 10, the problem of a void still exists, and the problem may negatively affect an electromagnetic characteristic of the wireless power receiving apparatus.

According to an embodiment of the present invention, a wall surface of a receiving coil is obliquely embedded in a soft magnetic layer to minimize a void formed after the receiving coil is embedded.

Figure 11:
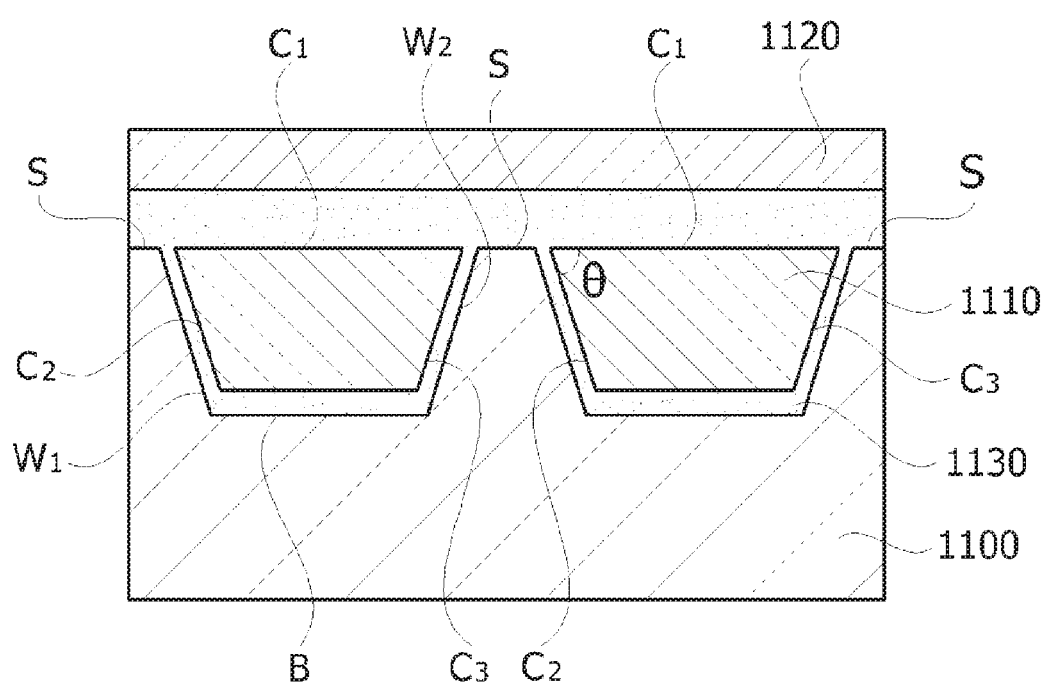
FIG. 11 is a cross-sectional view of a soft magnetic layer and a receiving coil according to an embodiment of the present invention.

FIG. 11 is a cross-sectional view of a soft magnetic layer and a receiving coil according to an embodiment of the present invention.

Referring to FIG. 11, receiving coils 1110 are formed on a soft magnetic layer 1100, and a support means 1120 is formed on the receiving coils 1110. The support means 1120 is for supporting the receiving coils 1110, may include a PET material, and may have the form of a film. The soft magnetic layer 1100, the receiving coils 1110, and the support film 1120 may be adhered by an adhesive 1130.

Here, the receiving coils 1110 may be wound in a spiral or helical shape in parallel with a plane of the soft magnetic layer 1100. The receiving coils 1110 may have a round shape, a racetrack shape, a rectangular shape, a triangular shape, a polygonal shape with round corners and the like, but embodiments are not limited thereto. The receiving coils 1110 are embedded in one surface of the soft magnetic layer 1100. Here, at least one surface of the receiving coils 1110 may be obliquely embedded in the surface of the soft magnetic layer 1100. That is, a wall surface of the receiving coils 1110 may be embedded in the surface of the soft magnetic layer 1100 to be inclined with respect to the surface instead of being perpendicular or parallel thereto. For example, a cross-section of the receiving coils 1110 includes one side C1 adjacent to a surface S of the soft magnetic layer 1100, and at least one of two sides C2 and C3 which meet the side C1 forms an inclination with the side C1. For example, the at least one of the two sides C2 and C3 which meet the side C1 may form an angle θ which is 50° or larger and smaller than 90°, preferably, an angle θ which is 60° or larger and 75° or smaller, and more preferably, an angle θ which is 65° or larger and 70° or smaller, with the side C1. Here, the side C1 of the cross-section of the receiving coils 1110 may be a side belonging to a surface coming into contact with the support layer 1120 with the adhesive layer 1130 interposed therebetween. The side C1 of the cross-section of the receiving coils 1110 may be a side belonging to a surface placed on the same plane as the surface S of the soft magnetic layer 1100 after the receiving coils 1110 are embedded.

In this way, when the receiving coils 1110 are formed so that the side C1 adjacent to the surface S of the soft magnetic layer 1100 and at least one of the two sides C2 and C3 which meet the side C1 form the angle θ which is smaller than 90°, gaps between the receiving coils 1110 are widened, and the soft magnetic layer 1100 having fluidity may be easily infiltrated into the gaps. Accordingly, a large amount of soft magnetic material is filled into the gaps between the receiving coils 1110 such that voids between the receiving coils 1110 are removed after the receiving coils 1110 are embedded, the electromagnetic characteristic is improved, and the transmission efficiency is increased.

Meanwhile, because the amount of soft magnetic material embedded between the receiving coils 1110 is increased as the side C1 adjacent to the surface S of the soft magnetic layer 1100 and the at least one of the two sides C2 and C3 which meet the side C1 is further smaller than 90°, a problem in which the thickness of the soft magnetic layer 1100 is increased due to the receiving coils 1110 being embedded therein can be mitigated. Accordingly, the total thickness of the soft magnetic layer 1100 and the receiving coils 1110 can be reduced. However, when the side C1 adjacent to the surface S of the soft magnetic layer 1100 and the at least one of the two sides C2 and C3 which meet the side C1 is smaller than 50°, even though the thickness of the soft magnetic layer 1100 and the receiving coils 1110 can be further reduced, the amount of receiving coils 1110 is reduced, and the transmission efficiency is decreased.

Meanwhile, the adhesive layer 1130 may have a both-sided structure including an insulating layer. For example, the adhesive layer 1130 may include a first adhesive layer, an insulating layer formed on the first adhesive layer, and a second adhesive layer formed on the insulating layer.

Here, the insulating layer may include a PET material. Accordingly, even when the first adhesive layer or the second adhesive layer are destroyed in a process for forming or embedding the receiving coils 1110 inside the soft magnetic layer 1100, an electrical short circuit between metal and the receiving coils within the soft magnetic layer 1100 may be prevented.

Although the cross-section of the receiving coils 1110 is illustrated as a trapezoid further including another side C4 which is in parallel with the side C1 adjacent to the surface S of the soft magnetic layer 1100 and meets the two sides C2 and C3, embodiments are not limited thereto.

Figure 12:
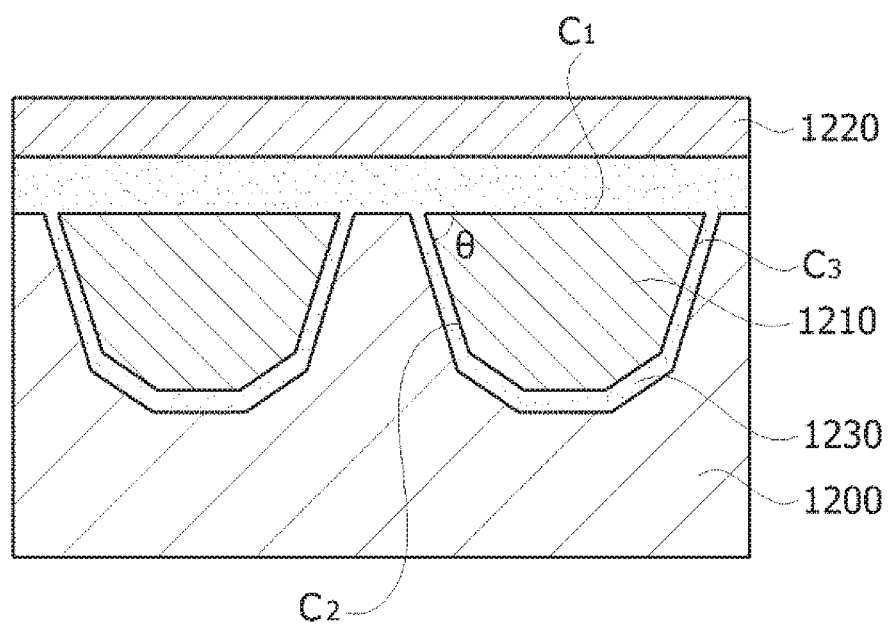
FIG. 12 is a cross-sectional view of a soft magnetic layer and a receiving coil according to another embodiment of the present invention.

As illustrated in FIG. 12, a cross-section of receiving coils 1210 may be a polygon including one side C1 adjacent to a surface S of a soft magnetic layer 1200 and two sides C2 and C3 which meet the side C1, and in which the side C1 and at least one of the two sides C2 and C3 form an inclination which is 50° or larger and smaller than 90°.

Figure 13:
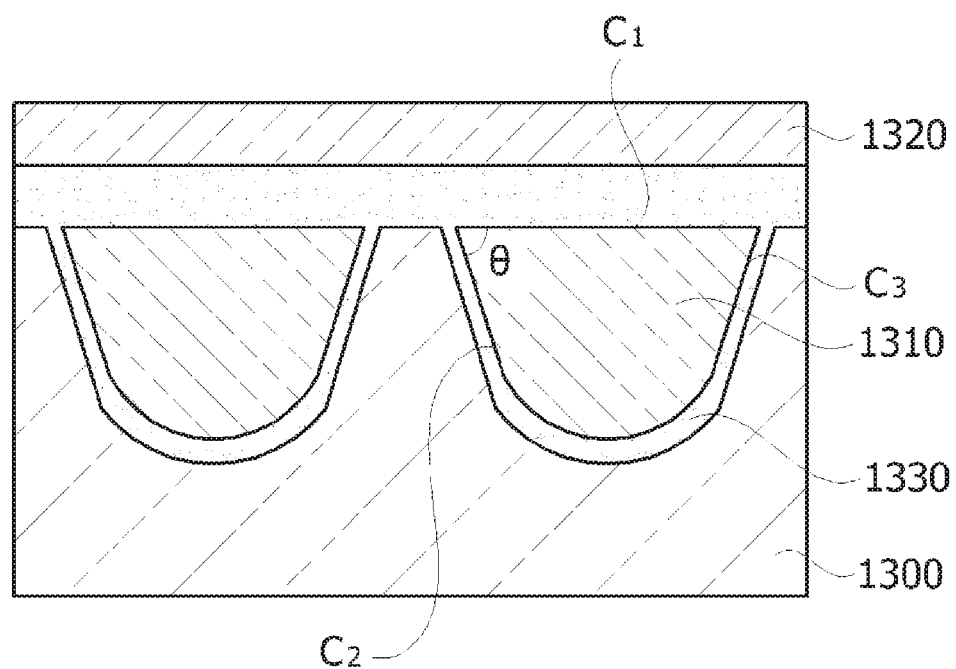
FIG. 13 is a cross-sectional view of a soft magnetic layer and a receiving coil according to still another embodiment of the present invention.

As illustrated in FIG. 13, a cross-section of receiving coils 1310 may include one side C1 adjacent to a surface S of a soft magnetic layer 1300 and two sides C2 and C3 which meet the side C1, the side C1 and at least one of the two sides C2 and C3 may form an inclination which is 50° or larger and smaller than 90°, and the cross-section may further include a curve C4 connecting the two sides C2 and C3.

As illustrated in FIGS. 11 to 13, a groove may be formed at one surface of a soft magnetic layer to accommodate a receiving coil therein. The groove may include both wall surfaces W1 and W2 which meet the surface S of the soft magnetic layer and a bottom surface B which meets the both wall surfaces W1 and W2, and the surface S and at least one of the both wall surfaces W1 and W2 may form an inclination. For example, when the side C1 and at least one of the two sides C2 and C3 of the receiving coils form an inclination which is 50° or larger and smaller than 90°, the surface S and at least one of the both wall surfaces W1 and W2 may form an angle which is larger than 90° and is 130° or smaller.

Alternatively, when the receiving coils are arranged on an upper surface of the soft magnetic layer, and then the soft magnetic layer and the receiving coils are compressed, the receiving coils may be embedded in the soft magnetic layer. To facilitate compressing the soft magnetic layer and the receiving coils and embedding the receiving coils, the soft magnetic layer may have fluidity. For this, the soft magnetic layer may be formed of a plurality of sheets containing soft magnetic metal powder and polymer resin.

Figure 14:
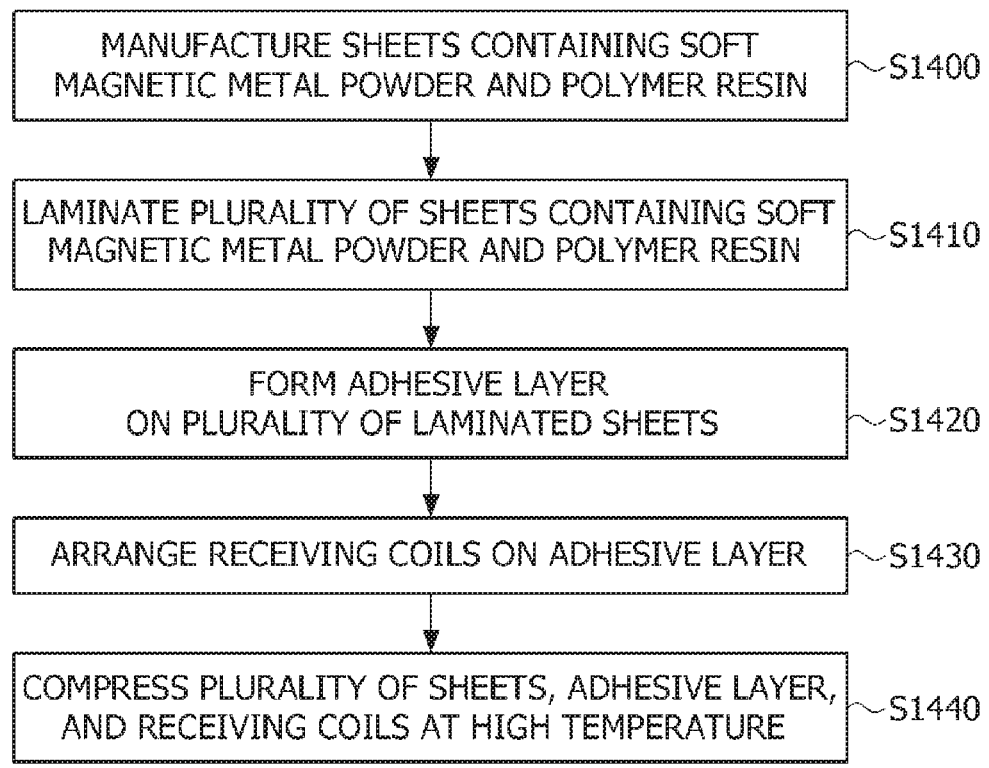
FIG. 14 is a flowchart illustrating a method of embedding a receiving coil in a soft magnetic layer according to an embodiment of the present invention.

FIG. 14 is a flowchart illustrating a method of embedding a receiving coil in a soft magnetic layer according to an embodiment of the present invention. Here, the soft magnetic layer is assumed as being formed of sheets containing soft magnetic metal powder and high polymer resin.

Referring to FIG. 14, sheets containing soft magnetic metal powder and polymer resin are manufactured (S1400). For this, ink containing a solvent, soft magnetic metal powder, and polymer resin may be casted onto a film to form a thin sheet. Here, the soft magnetic metal powder may include, for example, an Fe—Si based alloy. Also, the polymer resin may include, for example, at least one polymer resin of rubber-based polymer resin, epoxy-based polymer resin, and Si-based polymer resin.

Next, the plurality of sheets are disposed (S1410), an adhesive layer is formed at an upper surface of the plurality of sheets (S1420), receiving coils are arranged on the adhesive layer (S1430), and the plurality of sheets, the adhesive layer, and the receiving coils are simultaneously compressed at high temperature (S1440). Here, the receiving coils may have inclined side surfaces. For example, as illustrated in FIGS. 11 to 13, the cross-section of the receiving coils may have an inclination which is 50° or larger and smaller than 90° with the upper surface of the plurality of sheets. Here, the compression process may be performed under pressure of 100 to 300 kgf/cm$^2$ for 0.5 to 4 hours at 80 to 250° C. For example, a start temperature 40° C. may be raised up to 180° C. in 30 minutes, 180° C. may be maintained for 30 minutes and then may be gradually lowered to 40° C. in 30 minutes. Simultaneously, an initial pressure 10 kgf/cm$^2$ may be maintained for 15 minutes, the pressure may be raised up to 120 kgf/cm$^2$ in 15 minutes, and 120 kgf/cm$^2$ may be further maintained for an hour.

In this way, when the plurality of sheets and the receiving coils are simultaneously compressed, a groove portion is formed at a boundary surface between the sheets and the receiving coils due to fluidity of polymer resin contained in the sheets, and voids are not formed because the polymer resin are infiltrated in between the receiving coils. Accordingly, a problem in which magnetic field guiding is decreased due to voids between the receiving coils and the soft magnetic layer can be prevented.

Also, because the groove portion formed at the boundary surface between the sheets and the receiving coils is thermally hardened in the process of compressing at high temperature, the groove portion can be stably implemented.

Also, because the polymer resin contained in the sheets becomes an insulating material with high thermal resistance by being compressed at high temperature, the polymer resin may perform an insulating function required between soft magnetic metal powder particles and prevent corrosion of the soft magnetic metal powder even in harsh outside environment.

Also, when the adhesive layer is formed to have the both-sided adhesive structure including the insulating layer therein as described above, an electrical short circuit can be prevented during the high-pressure compression of the plurality of sheets and the receiving coils even when the adhesive layer is partially stripped.

Hereinafter, experimental results of transmission efficiencies according to conditions in which receiving coils are arranged and embedded will be described.

Embodiment 1

After sequentially laminating a soft magnetic layer having a thickness of 430 μm, an adhesive layer having a thickness of 54 μm, receiving coils having a thickness of 170 μm (an angle between one side adjacent to a surface of the soft magnetic layer and two sides which meet the one side is 70°), and a support film having a thickness of 25 μm in that order, the soft magnetic layer, the adhesive layer, the receiving coils, and the support film were compressed at high temperature for 30 minutes under conditions of 180, 120 kgf/cm$^3$. Also, transmission efficiency (Tx-A1) was measured under conditions in which transmitting power wad 3.5 W, 4.0 W, 4.5 W, and 4.9 W.

Embodiment 2

After sequentially laminating a soft magnetic layer having a thickness of 430 μm, an adhesive layer having a thickness of 54 μm, receiving coils having a thickness of 170 μm angle between one side adjacent to a surface of the soft magnetic layer and two sides which meet the one side is 65°), and a support film having a thickness of 25 μm in that order, the soft magnetic layer, the adhesive layer, the receiving coils, and the support film were compressed at high temperature for 30 minutes under conditions of 180, 120 kgf/cm$^3$. Also, transmission efficiency (Tx-A1) was measured under conditions in which transmitting power was 3.5 W, 4.0 W, 4.5 W, and 4.9 W.

Embodiment 3

After sequentially laminating a soft magnetic layer having a thickness of 430 μm, an adhesive layer having a thickness of 54 μm, receiving coils having a thickness of 170 μm (an angle between one side adjacent to a surface of the soft magnetic layer and two sides which meet the one side is 50°), and a support film having a thickness of 25 μm in that order, the soft magnetic layer, the adhesive layer, the receiving coils, and the support film were compressed at high temperature for 30 minutes under conditions of 180, 120 kgf/cm$^3$. Also, transmission efficiency (Tx-A1) was measured under conditions in which transmitting power was 3.5 W, 4.0 W, 4.5 W, and 4.9 W.

Comparative Example 1

After sequentially laminating a soft magnetic layer having a thickness of 430 μm, an adhesive layer having a thickness of 54 μm, receiving coils having a thickness of 170 μm, and a support film having a thickness of 25 μm in that order, transmission efficiency (Tx-A1) was measured under conditions in which transmitting power was 3.5 W, 4.0 W, 4.5 W, and 4.9 W.

Comparative Example 2

After sequentially laminating a soft magnetic layer having a thickness of 430 μm, an adhesive layer having a thickness of 54 μm, receiving coils having a thickness of 170 μm (an angle between one side adjacent to a surface of the soft magnetic layer and two sides which meet the one side is 90°), and a support film having a thickness of 25 μm in that order, the soft magnetic layer, the adhesive layer, the receiving coils, and the support film were compressed at high temperature for 30 minutes under conditions of 180, 120 kgf/cm$^3$. Also, transmission efficiency (Tx-A1) was measured under conditions in which transmitting power was 3.5 W, 4.0 W, 4.5 W, and 4.9 W.

Comparative Example 3

After sequentially laminating a soft magnetic layer having a thickness of 430 μm, an adhesive layer having a thickness of 54 μm, receiving coils having a thickness of 170 μm (an angle between one side adjacent to a surface of the soft magnetic layer and two sides which meet the one side is 45°), and a support film having a thickness of 25 μm in that order, the soft magnetic layer, the adhesive layer, the receiving coils, and the support film were compressed at high temperature for 30 minutes under conditions of 180, 120 kgf/cm$^3$. Also, transmission efficiency (Tx-A1) was measured under conditions in which transmitting power was 3.5 W, 4.0 W, 4.5 W, and 4.9 W.

Figure 15:
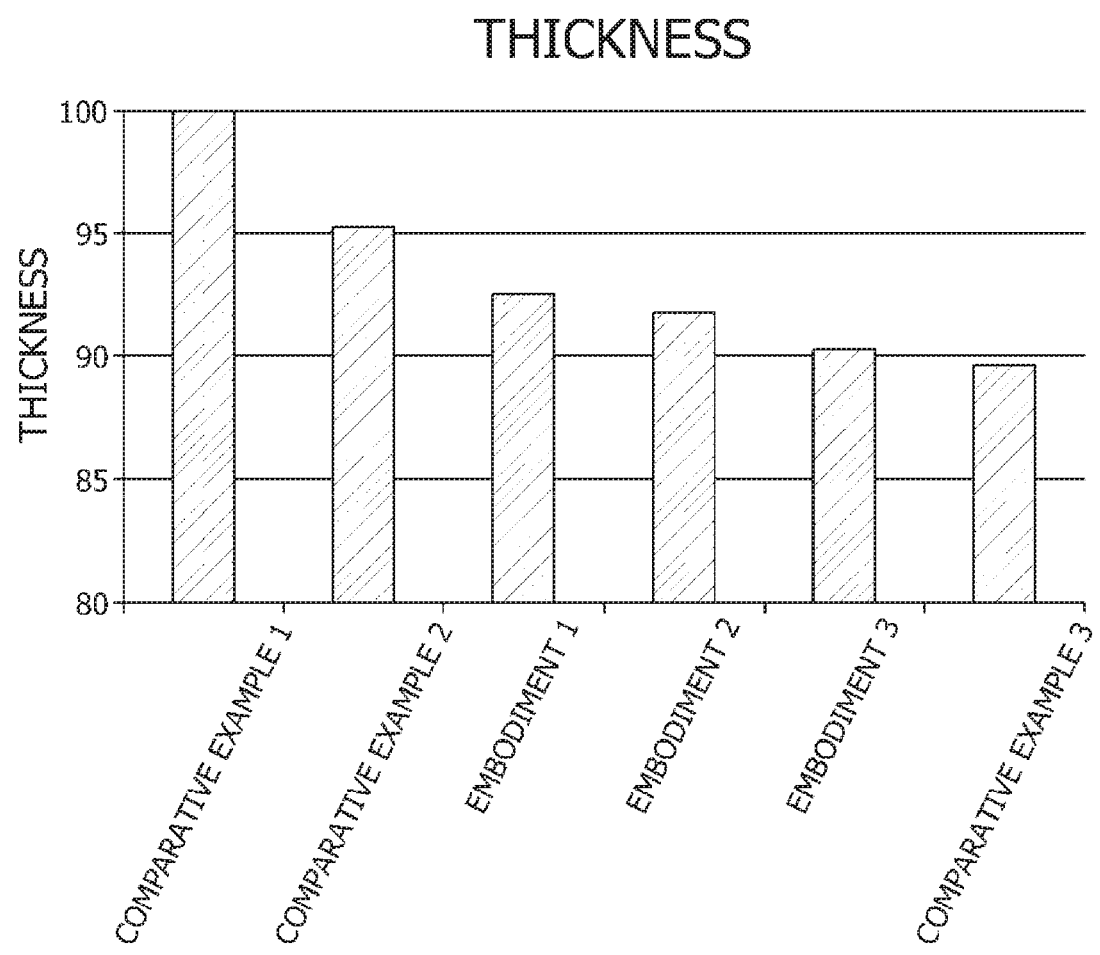
FIG. 15 is a result showing final thicknesses in Embodiments 1 to 3 and Comparative examples 1 to 3 with a graph.
Figure 16:
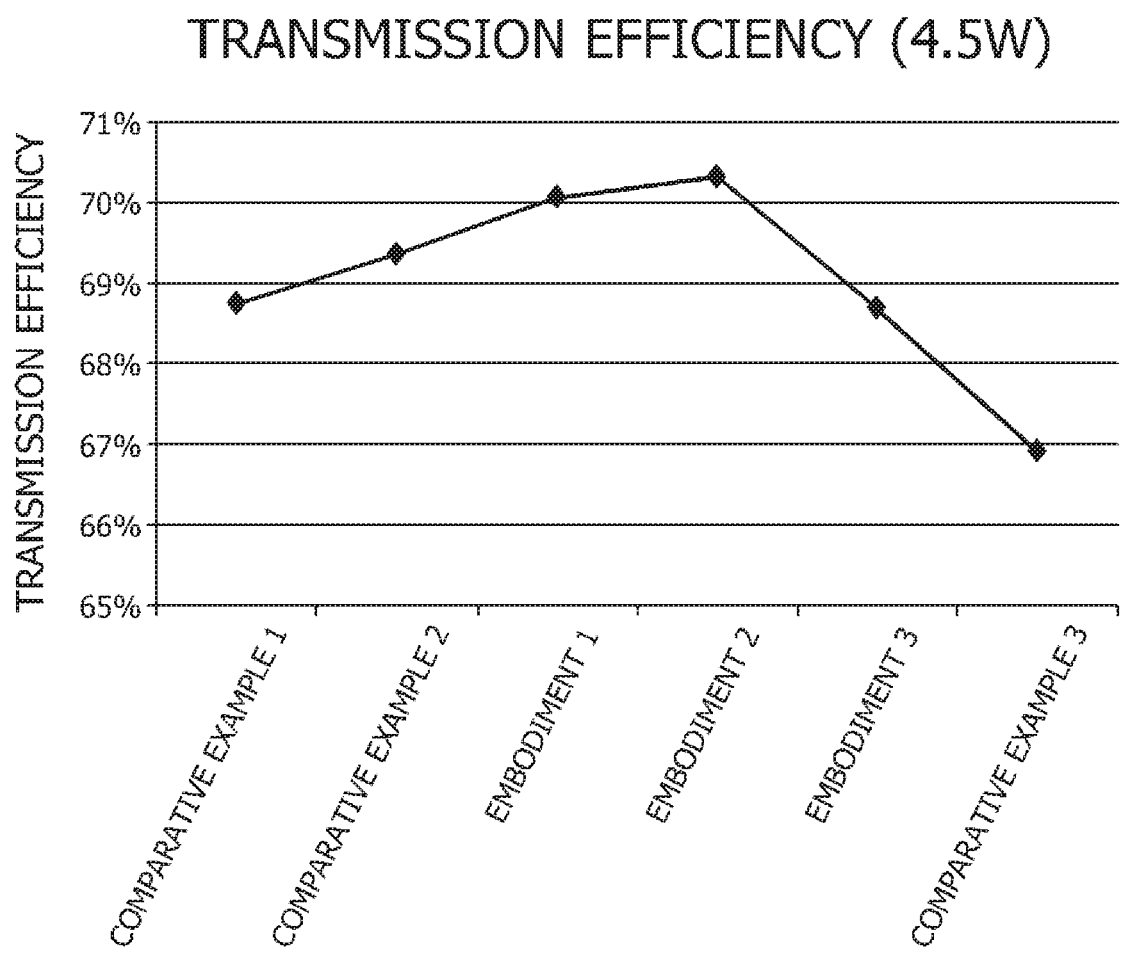
FIG. 16 is a result showing transmission efficiencies in Embodiments 1 to 3 and Comparative examples 1 to 3 with a graph.

Table 1 is a result of measuring final thicknesses and transmission efficiencies after compression in Embodiments 1 to 3 and Comparative examples 1 to 3, FIG. 15 is a result showing final thicknesses after compression in Embodiments 1 to 3 and Comparative examples 1 to 3 with a graph, and FIG. 16 is a result showing transmission efficiencies in Embodiments 1 to 3 and Comparative examples 1 to 3 with a graph.

TABLE 1

| No. | Thickness (μm) | Transmission efficiency (Tx-A1) | | | |
|---|---|---|---|---|---|
| | | 3.5 W | 4.0 W | 4.5 W | 4.9 W |
| Embodiment 1 | 629 | 71.43% | 71.03% | 70.07% | 68.82% |
| Embodiment 2 | 624 | 71.74% | 71.31% | 70.32% | 68.74% |
| Embodiment 3 | 613 | 70.24% | 69.60% | 68.69% | 67.25% |
| Comparative example 1 | 679 | 70.42% | 69.71% | 68.75% | 67.34% |
| Comparative example 2 | 647 | 70.97% | 70.17% | 69.36% | 67.69% |
| Comparative example 3 | 609 | 68.45% | 67.83% | 66.91% | 65.99% |

Referring to Table 1 and FIGS. 15 and 16, it can be recognized that, in Embodiments 1 and 2 in which wall surface of receiving coils is embedded in an angle of 70° or 65°, the thickness is small and the transmission efficiency is high compared to Comparative example 1 in which receiving coils are not embedded and Comparative example 2 in which receiving coils are embedded in an angle of 90°.

Meanwhile, it can be recognized that, in Embodiment 3 in which a wall surface of receiving coils is embedded in an angle of 50°, the transmission efficiency is similar but the thickness is significantly smaller compared to Comparative example 1 or Comparative example 2.

However, it can be recognized that, in Comparative example 3 in which a wall surface of receiving coils is embedded in an angle of 45°, the thickness is small but the transmission efficiency is low such that the transmission efficiency is 68% or lower with respect to 4.5 W.

Although an example in which an embodiment of the present invention is applied to a receiving antenna of a wireless power receiving apparatus has been described for convenience of description, embodiments are not limited thereto. An embodiment of the present invention may also be applied to a structure between a soft magnetic core and a transmitting coil included in a transmitting antenna of a wireless power transmitting apparatus.

Although description has been given with reference to preferred embodiments of the present invention, one of ordinary skill in the art should understand that the present invention can be modified and changed in various ways within the scope not departing from the spirit and the range of the present invention described in the claims below.

The invention claimed is:
1. A receiving antenna of a wireless power receiving apparatus for wireless power charging, the receiving antenna comprising:

a substrate;
a soft magnetic layer disposed on the substrate; and
a receiving coil that is wound in parallel with a plane of the soft magnetic layer and is embedded in a surface of the soft magnetic layer,
wherein the receiving coil comprises an upper surface and a first embedded surface that is obliquely embedded in the surface of the soft magnetic layer, and
wherein a first inclination angle between the upper surface of the receiving coil and the first embedded surface of the receiving coil is in a range of from 60° to 75°.

2. The receiving antenna of claim 1, wherein a cross-section of the receiving coil, taken in a direction perpendicular to the plane of the soft magnetic layer, comprises the upper surface and the first embedded surface.

3. The receiving antenna of claim 1, wherein the first inclination angle is in a range of from 65° to 70°.

4. The receiving antenna of claim 2, wherein the cross-section of the receiving coil is a polygon including the upper surface, the first embedded surface, and a second embedded surface.

5. The receiving antenna of claim 4, wherein the cross-section of the receiving coil is a trapezoid including a third embedded surface parallel to the upper surface.

6. The receiving antenna of claim 2, wherein the cross-section of the receiving coil includes a second embedded surface and a third embedded surface that is a curved surface connecting the first embedded surface and the second embedded surface.

7. The receiving antenna of claim 1, wherein an insulating layer is formed between the soft magnetic layer and the receiving coil.

8. The receiving antenna of claim 7, wherein the insulating layer includes a polyethylene terephthalate (PET) material.

9. The receiving antenna of claim 1, wherein the soft magnetic layer includes a plurality of sheets containing soft magnetic metal powder and polymer resin.

10. The receiving antenna of claim 1, comprising a support means disposed on the receiving coil.

11. The receiving antenna of claim 10, wherein a total thickness of the soft magnetic layer, the receiving coil, and the support means is 613 µm or larger and smaller than 647 µm.

12. The receiving antenna of claim 2, wherein the cross-section of the receiving coil is a polygon including the upper surface, the first embedded surface, and a second embedded surface, and
wherein a second inclination angle between the upper surface of the receiving coil and the second embedded surface of the receiving coil is in a range of from 65° to 70°.

13. The receiving antenna of claim 12, wherein the cross-section of the receiving coil includes:
a third embedded surface opposite from the upper surface;
a fourth embedded surface connecting the first embedded surface and the third embedded surface; and
a fifth embedded surface connecting the second embedded surface and the third embedded surface.

14. The receiving antenna of claim 13, comprising a support means disposed on the receiving coil,
wherein a total thickness of the soft magnetic layer, the receiving coil, and the support means is 613 µm or larger and smaller than 647 µm.

15. A receiving antenna of a wireless power receiving apparatus for wireless power charging, the receiving antenna comprising:
a substrate;
a soft magnetic layer disposed on the substrate and having a groove formed on a surface thereof; and
a receiving coil that is wound in parallel with a plane of the soft magnetic layer and is accommodated in the groove formed on the surface of the soft magnetic layer,
wherein the groove includes a first wall surface and a second wall surface that both meet the surface of the soft magnetic layer and a bottom surface that meets the first wall surface and the second wall surface,
wherein a first inclination angle between the first wall surface and the bottom surface is in a range of from 105° to 120°, and
wherein a second inclination angle between the second wall surface and the bottom surface is in a range of from 105° to 120°.

16. The receiving antenna of claim 14, wherein the groove includes:
a third wall surface at a bottom thereof;
a fourth wall surface connecting the first wall surface and the third wall surface; and
a fifth wall surface connecting the second wall surface and the third wall surface.

17. A wireless power receiving apparatus for wireless power charging, the wireless power receiving apparatus comprising:
a substrate;
a soft magnetic layer disposed on the substrate;
a receiving coil that is wound in parallel with a plane of the soft magnetic layer and is embedded in a surface of the soft magnetic layer;
a circuit unit connected to the receiving coil and configured to convert the electromagnetic energy into electrical energy; and
a storage unit configured to store the electrical energy,
wherein the receiving coil comprises an upper surface and a first embedded surface that is obliquely embedded in the surface of the soft magnetic layer, and
wherein a first inclination angle between the upper surface of the receiving coil and the first embedded surface of the receiving coil is in a range of from 60° to 75°.

18. The wireless power receiving apparatus of claim 17, wherein a cross-section of the receiving coil, taken in a direction perpendicular to the plane of the soft magnetic layer, comprises the upper surface and the first embedded surface.

19. The wireless power receiving apparatus of claim 18, wherein the cross-section of the receiving coil is a polygon including the upper surface, the first embedded surface, and a second embedded surface, and
wherein a second inclination angle between the upper surface of the receiving coil and the second embedded surface of the receiving coil is in a range of from 65° to 70°.

20. The wireless power receiving apparatus of claim 19, wherein the cross-section of the receiving coil includes:
a third embedded surface opposite from the upper surface;
a fourth embedded surface connecting the first embedded surface and the third embedded surface; and
a fifth embedded surface connecting the second embedded surface and the third embedded surface.

21. The wireless power receiving apparatus of claim 20, comprising a support means disposed on the receiving coil,
wherein a total thickness of the soft magnetic layer, the receiving coil, and the support means is 613 µm or larger and smaller than 647 µm.

* * * * *